United States Patent [19]
Rigney et al.

[11] 3,809,013
[45] May 7, 1974

[54] DISPOSABLE INSERT FOR LITTER BOX
[75] Inventors: Jack C. Rigney, San Francisco; Samuel H. Hollis, Alameda; Nathaniel J. Doonan, Sausalito, all of Calif.
[73] Assignee: The Thursday Company, San Francisco, Calif.
[22] Filed: Nov. 6, 1972
[21] Appl. No.: 304,169

Related U.S. Application Data
[63] Continuation-in-part of Ser. No. 140,901, May 6, 1971, abandoned.

[52] U.S. Cl. .................................................. 119/1
[51] Int. Cl. .............................................. A01k 29/00
[58] Field of Search ........................................ 119/1

[56]  References Cited
UNITED STATES PATENTS
3,141,441  7/1964  Russell ..................................... 119/1
2,963,003  12/1960  Oberg et al. ............................ 119/1
3,227,137  1/1966  Goldman et al. ........................ 119/1
3,416,495  12/1968  Wilson ..................................... 119/1
3,684,155  8/1972  Smith ....................................... 119/1

Primary Examiner—Hugh R. Chamblee
Attorney, Agent, or Firm—Townsend and Townsend

[57]  ABSTRACT

An insert for placement in an open, self-supporting tray for use as an animal litter box. A number of disposable screens are stacked on top of each other, constructed of flat, thin flexible material such as paper or plastic film, include a plurality of holes at their center portion and are placed in the tray so that walls of the tray fold the screens into a receptacle. Means is provided for closing the holes in the screens to prevent articles from entering the holes and for opening them upon lifting a screen from the stack. To change the liner and dispose of waste, the top liner is lifted whereby litter sifts through the holes onto the remaining screens for reuse while the liner and the waste thereon are discarded.

26 Claims, 8 Drawing Figures

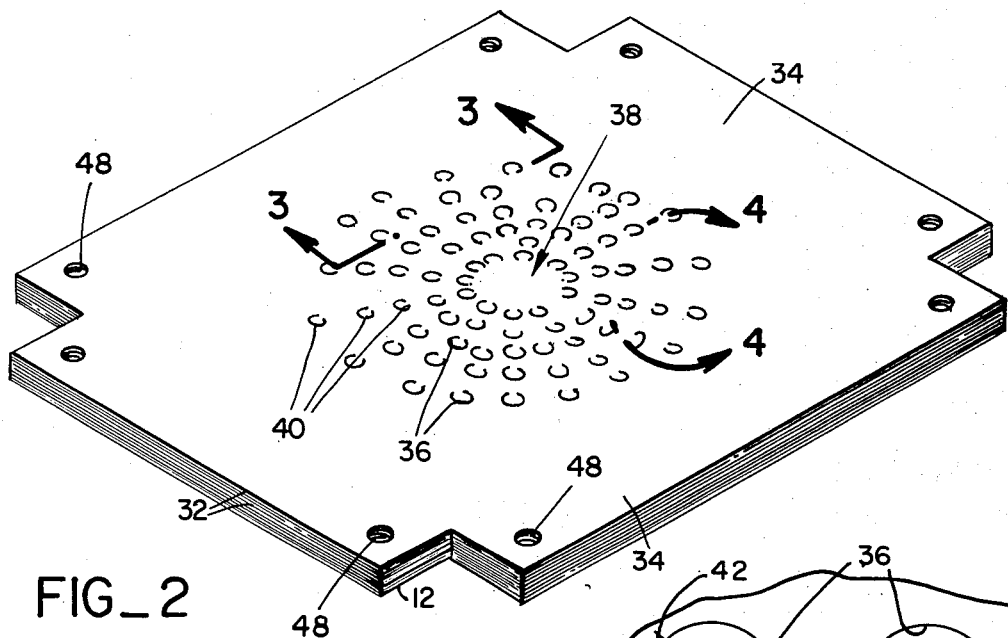
FIG_2
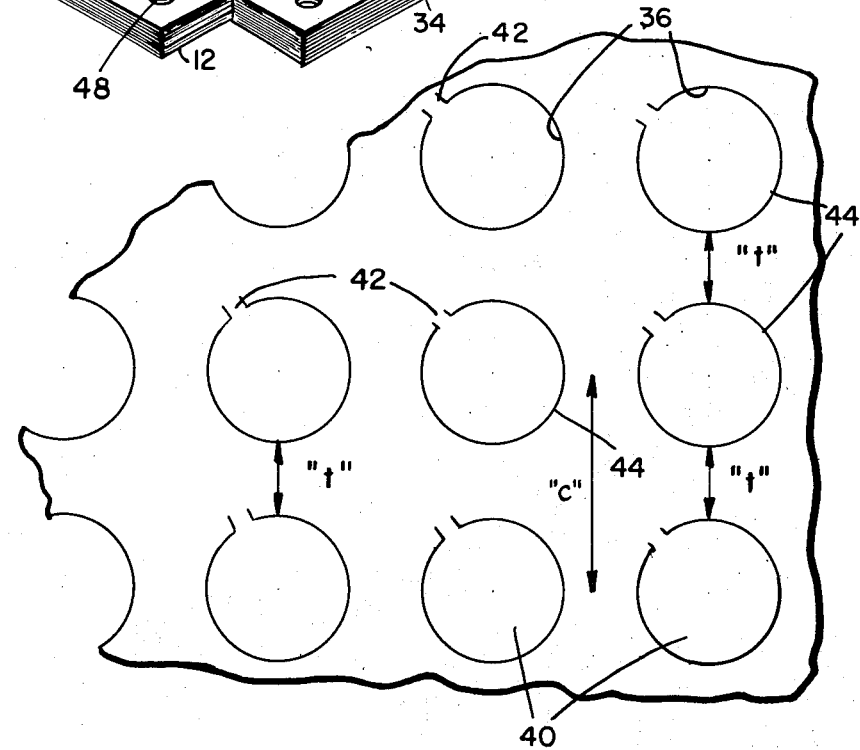
FIG_4
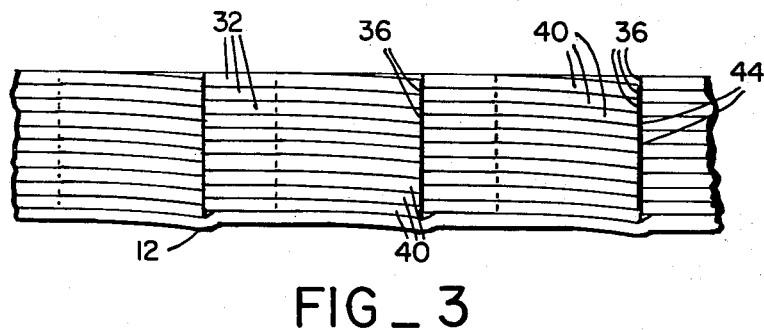
FIG_3

3,809,013

DISPOSABLE INSERT FOR LITTER BOX

RELATED APPLICATIONS

This application is a continuation-in-part application of the copending patent application Ser. No. 140,901 filed May 6, 1971 for DISPOSABLE INSERT FOR LITTER BOX, now abandoned.

BACKGROUND OF THE INVENTION

Domestic animals frequently use litter boxes filled with various kinds of granular materials such as sand, cat litter and the like. These boxes must be periodically emptied and cleaned which are usually somewhat objectionable tasks.

Since in the past the litter was placed directly in the box, a cleaning of the box required discarding of the litter. In urban areas, litter is usually bought from stores and is relatively expensive. The frequent changing of the litter box therefore could amount to a significant financial burden on the animal owner.

SUMMARY OF THE INVENTION

The present invention provides means to eliminate the most objectionable portion of litter box cleaning and provides convenient means for the repeated reuse of unsoiled litter. The animal owner thus enjoys substantial cost savings.

A liter box constructed in accordance with the present invention generally comprises a self-supporting frame, e.g. an open tray and, positioned therein, a litter base or liner constructed of a thin, flat, flexible sheet for placement in the box to form a receptacle. One or more waste removal screens constructed of a thin, flat, flexible sheet and which includes a plurality of openings generally arranged about a center of the screen is placed into the receptacle and onto the liner. Means are further provided for closing the holes as long as the screen remains in its operative position in the receptacle and for opening them upon the lifting of the removal screens from the base to permit the sifting of litter and retain waste on the screen for the subsequent disposal thereof.

In the presently preferred embodiment of the invention the closing means for the holes in the screen flaps integrally constructed with and hingeably secured to the screen. A plurality of screens are stacked one on top of the other and the holes, flaps and hinges are formed by conventional die-stamping methods. When the flaps are die-stamped they are biased into intimate contact with the next adjacent screen. Frequently, a portion of the flap engages the hole in the next adjacent screen. These intimate engagements form a releasable connection between the screens which maintains the screens aligned in a unitary package that is conveniently sold and placed into the litter box.

In use litter is poured into the folded screen stack placed in the litter box. To discard waste the top screen is lifted from the screen stack. The above discussed connection between the screens in the stack is readily released and has a tendency to open the flaps downwardly as the screen is pulled upwardly. Once open, unsoiled litter flow freely through the holes onto the next lower screen in the stack while soiled litter and animal waste remains in the screen for subsequent disposal.

The sifting of the litter is facilitated by orienting the hinges connecting the flaps to the screen so that they face the center of the screen. Upon removal of the screen by holding it along its edges the screen is progressively bent upwardly from the edges towards its center whereby the flaps are successively biased out of alignment with the screen to thereby open the holes. This greatly facilitates the ease of handling the screen and assures that unsoiled litter will pass through open holes for reuse.

In another embodiment of the invention, the means for closing the openings in the screen comprise short, stubby cylindrical discs or plugs bonded to one side of the liner. The discs have a diameter equal to the diameter of the openings in the screen so that they completely fill the openings and prevent the passage of all materials. The plugging function of the disc is enhanced by constructing them of relatively soft and resilient materials such as rubber. When constructed of soft materials the discs further exert a greater retaining force and prevent an accidental disengagement of the screen from the liner.

The liner and the screen are preferably both constructed of relatively inexpensive, readily available material such as wax impregnated ("waxed") paper of thin plastic film of a thickness no greater than about 0.010 inch. The liner and the screen can be scored parallel to their edges to facilitate shaping the sheets into a receptacle having upright walls defined by the sheet edges and the score lines. Furthermore, to positively prevent spillage of litter and the like into the supporting tray adjacent ends of the upright liner and/or screen walls can be interconnected to form a continuous wall defining the receptacle for the litter. Such means can comprise pleated sections of plastic film that can be gathered into a corner between and connected to adjacent walls of the liner or a screen.

BRIEF DESCRIPTION OF THE DRAWINGS

FIG. 2 is an exploded perspective view of the components of the litter box illustrated in FIG. 1 and includes an optional cover for the box;

FIG. 3 is a cross-sectional, side elevational view of the litter box and is gaken on line 3—3 of FIG. 1;

FIG. 4 is a perspective plan view of a disposable set of litter box screens constructed in accordance with the presently preferred embodiment of the invention;

DESCRIPTION OF THE PREFERRED EMBODIMENTS

Figure 1:
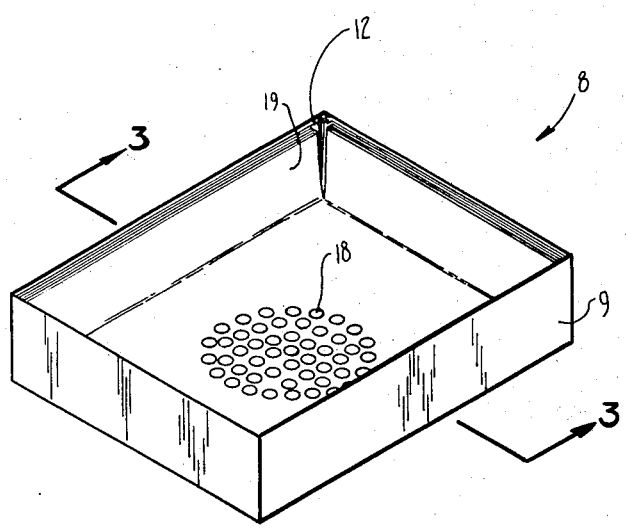
FIG. 1 is a perspective view of a litter box constructed in accordance with the invention.

Referring to FIG. 1, a litter box 8 constructed in accordance with the invention comprises a conventional self-supporting frame or open tray 9 having upright walls 10 and a flat bottom member 11 (shown in FIG. 3). Disposed inside the tray is a liner 12 constructed of a thin, flat, flexible, rectangular sheet such as a waxed paper or thin plastic film. Edge portions 14 and 15 of the liner are tilted upwardly to conform them to the walls of box 8.

A plurality of screens 32 are placed on top of liner 12 and also include upwardly tilted sidewalls 34. The screens have the same outline as liner 12, that is, a generally rectangular outline for the usual rectangular litter boxes 8 and they include a multiplicity of holes 36 distributed about a center 38 of the screens. Each hole is closed with a flap 40 that is connected with the screen by a hinge 42. The holes, flaps and hinges are die-stamped or formed in any other convenient manner. Thus, the flaps of the hinges are integral with the screen. The hinges are relatively narrow to render the flaps readily hingeable and for purposes more fully set forth hereinafter they are positioned so that they face, or are generally directed towards screen center 38.

Holes 36 preferably have a diameter of about 0.5 inch to facilitate sifting of litter therethrough while retaining soiled litter and animal waste on the screen. When the screens are constructed of waxed paper, say 36-pound paper impregnated with a wax or the like to prevent it from becoming soggy when the litter box is in use, the minimum distance $t$ between adjacent holes is about 0.25 inch with a resulting center spacing C between adjacent holes of about 0.75 inch. In this manner, the screen has sufficient strength for lifting it with the litter without repturing the screen while unsoiled litter readily passes through the holes. An increase in the hole spacing makes it more difficult to sift unsoiled litter while a decrease may result in partial breakage of the screen and possible passage of waste material onto the lower screen.

Referring now particularly to FIG. 3, holes 36, flaps 40 and hinges 42 are preferably die-stamped. When die-stamping, free ends 44 of the flaps is biased downwardly out of alignment with the plane of the corresponding screen towards the next adjacent screen. At the same time the free ends and, to a lesser degree intermediate portions of the flaps, come into intimate engagement with the next adjacent lower screen, with the flaps of that screen and with the aligned openings in that screen. This forms a readily released cold weld or connection between adjacent screens of the stack and thereby secures the screen to each other while maintaining them in mutual alignment. This enhances the marketing of the product because it has an appealing appearance and facilitates the ease with which the screens are handled and inserted into the litter box.

Referring again to FIGS. 1–4, in use a liner 12, which does not have holes as do screens 32 and a stack of screens are folded and placed into box 8. A 1 to 2 inch layer of litter, that is fine granular material, is placed on the uppermost screen and a cover (not shown in FIGS. 1–4) can be placed over the box.

After the litter box has been frequented by an animal, say a cat, and it is time to discard waste, the top screen is lifted from the stack by grasping its upwardly deflected edges and pulling up. First, this progressively bends the center portion of the screen about screen center 38 from adjacent the screen sidewalls towards the center thereof. Such bending has a tendency to pop flaps downwardly whereby the holes are opened. The engagement of the flaps with the lower screen from the stamping operation pulls the flaps downwardly with respect to the screen the thus aids in opening the flaps. Lastly, the weight of loose, unsoiled litter on the screen also pushes the flaps downwardly so that upon lifting of the top screen the loose litter readily sifts through the holes in the screen onto the next lower screen while soiled litter and waste is retained for disposal with the screen. Sifted litter is collected by the next lower screen. Flaps 40 of the next lower screen are closed and prevent litter from sifting downwardly towards liner 12.

Thus, the present invention makes heretofore disagreeable waste disposal tasks more convenient, clean and hygienic. Moreover, litter consumption can be substantially reduced and results in significant savings for the animal owner.

Figure 5:
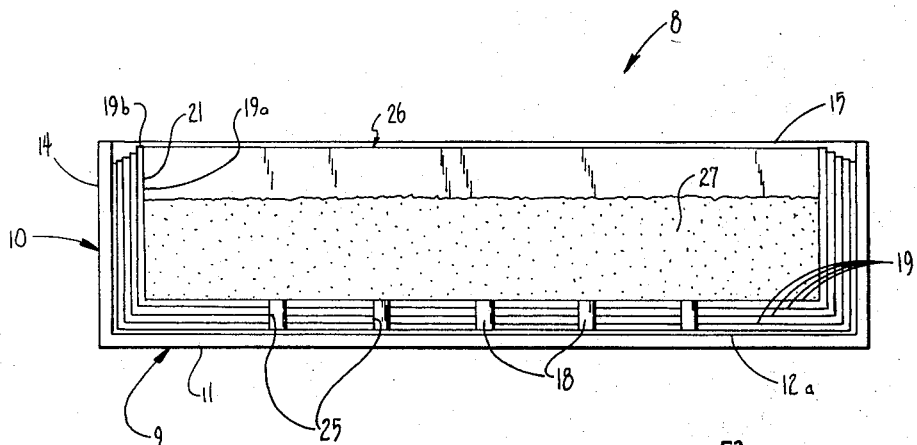
FIG. 5 is an enlarged, fragmentary side elevational view of the stack illustrated in FIG. 4 and is taken on line 5—5 of FIG. 4.
Figure 6:
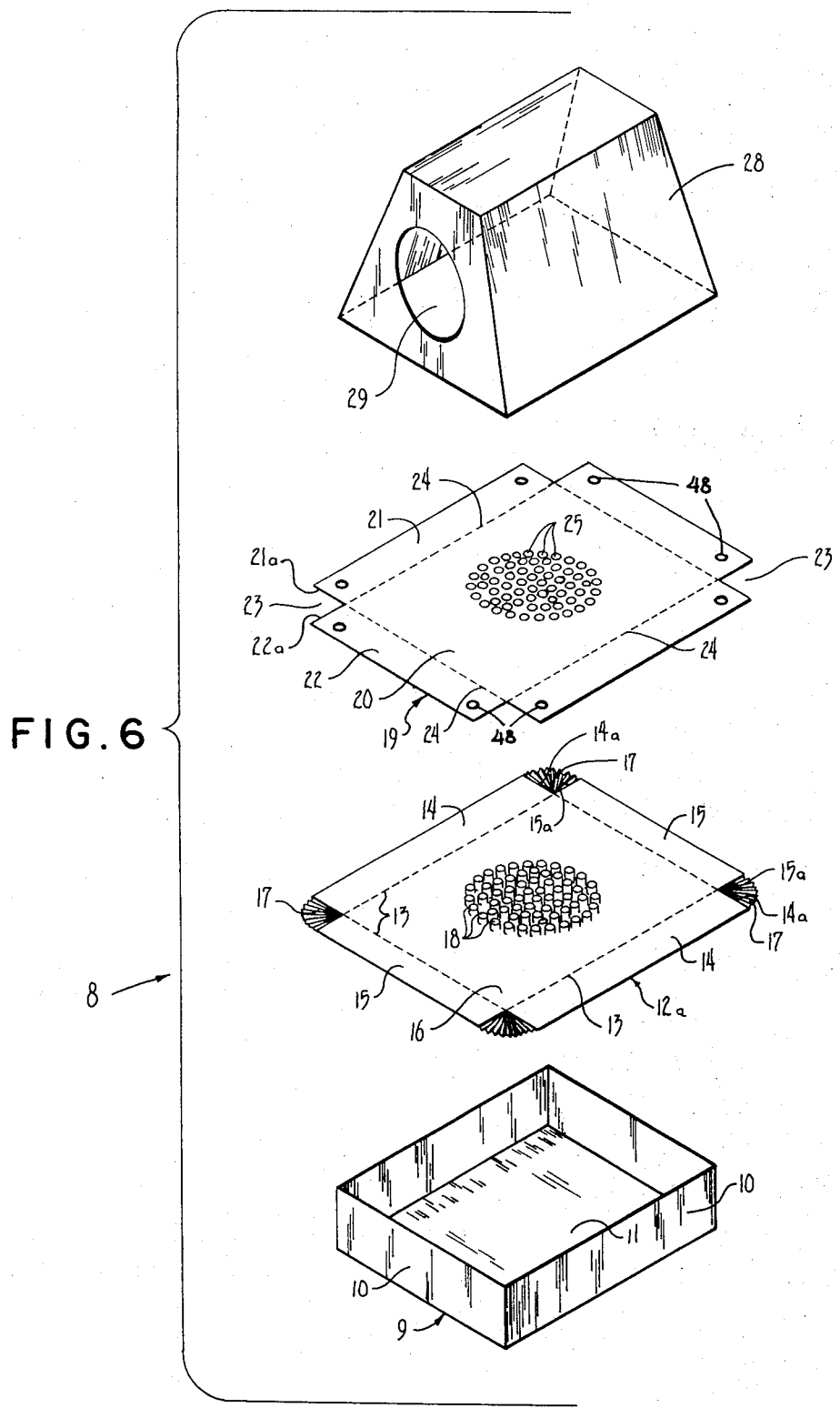
FIG. 6 is an enlarged, fragmentary plan view of the stack illustrated in FIG. 4.

Referring to FIGS. 5 and 6, in another embodiment of the invention a liner 12a may be constructed of thin flexible plastic film, it may include score lines 13 to facilitate the ease with which the edge portions are folded and it includes a multiplicity of upwardly directed plugs 18 for purposes more fully described hereinafter. When the liner is folded and positioned in the box, adjacent ends 14a and 15a of edge portions 14 and 15 are in close proximity. To prevent the escape of fluids such as liquids, loose granular materials and the like, fluted or pleated sections 17 can be connected to each adjacent end of the edge portions. The fluted sections are readily folded into a corner of tray 9 when the liner is inserted therein. The fluted sections can be separately constructed and thereafter bonded, welded or the like, to the sheet or, if the sheet is constructed of a thermosetting material, they can be heat deformed directly into the material simultaneously with the forming of the score lines.

The upright cylindrical plugs 18 are preferably uniformly arranged about the center of liner center portion 16. Tee plugs have a preferably cylindrical cross section, are relatively short and extend no more than about 0.25 to 0.375 of an inch away from the liner. The plugs are bonded, welded or otherwise secured to the liner in a conventional manner. Although the plugs can be constructed of substantially any desired material, it is preferred to construct them of a material exhibiting a relatively high friction surface such as relatively soft rubber materials and the like.

Placed over liner 12a are a plurality of screens 19. The screen can be constructed of waxed paper or, if more expedient, of thin, flat, flexible sheets such as thin plastic film. The screens have a center section 20 from which two sets of rectangularly shaped side sections 21 and 22 extend. Ends 21a and 22a of the end sections define cutout portions 23 that are left open or, optionally, that can be filled with fluted material (not shown) in the same manner in which the cutouts between the end portions of the liner are filled. Score lines 24 between the center and end sections can be provided, particularly if the screen material is relatively stiff, to facilitate upward deflection of the end sections into substantially continuous upright walls.

At about the center of center section 20 each screen 19 includes a plurality of holes 25 which equal in number the number of plugs 18 on liner 12 and which are arranged to correspond to the positioning of the plugs on the liner so that score lines 13 of the liner and 24 of the screen are aligned when the plugs protrude through the holes. Holes 25 have further have a diameter substantially equal to the diameter of plugs 18 so that the plugs can protrude through the holes yet prevent the passage of fluid and particularly of fine granular materials such as cat litter. When the plugs are constructed of a high friction material as aforementioned, their snug engagement of holes 25 inhibits slippage of the screens along the plugs and thus retains the screens to the liner to prevent accidental separation of the screen from the plugs.

Again, holes 25 in screens 19 should have a diameter no greater than about 0.5 inch. This also determines the diameter of liner plugs 18. If the screens are constructed of plastic film having a thickness of 0.010 inch, the minimum distance between adjacent holes can be reduced to no less than about 0.125 inch; preferably, such distance is 0.125 to 0.25 inch to prevent tearing of the screen when filled with litter. It is preferred to arrange the holes in a circle of say elevan inches in diameter at the center of screen center section 20.

This embodiment of the invention is used in substantially the same manner as the earlier described one. Thus, screens 19 are placed on top of liner 12a in box 9 with screen holes 25 engaged and sealed by liner plugs 18. In this position top screen 19a with its side sections 21 and 22 outwardly oriented defines a receptacle 26. A typical use of that receptacle is in litter boxes for cats and like domestic animals. Litter 27, that is. fine granular material, is filled into receptacle 26 1 to 2 inches above center section 20 of the top screen. A cover 28 can be placed over tray 9 or into receptacle 26 so that it covers center section 20. The cover includes a hole 29 of a sufficient diameter to permit the ingress or egress of an animal.

After the litter box has been frequented by the animal and it is time to discard waste, cover 28 is removed from tray 9. Top screen 19a is now lifted from the remaining screens by grasping a portion 19b projecting above the remaining screens to pull holes 25 free of liner plugs 18. At that point the top screen takes on a U-shape with holes 25 disposed at the lower end of the liner so that the fine granular litter sifts through the holes onto the next screen for further use. Solid waste is retained on the screen for the disposition thereof while enveloped in the plastic screen to prevent soiling of the surroundings and/or the escape of objectionable odors.

This task is intermittently repeated until the stack of screens placed on top of liner 12 have been used up. Thereupon the remaining litter together with the liner can be discarded and a new liner-screen set is placed in tray 9. Alternatively, remaining litter, if not badly soiled or wetted, can be reused.

Figure 7:
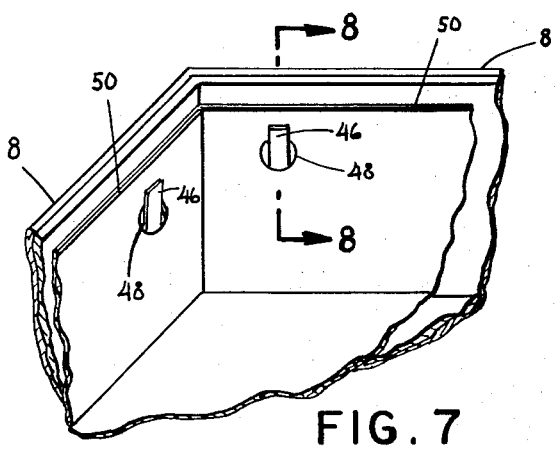
FIG. 7 is a fragmentary perspective view of a litter box constructed in accordance with the invention and illustrates the provision of tabs on the box for supporting thin, collapsable screens.
Figure 8:
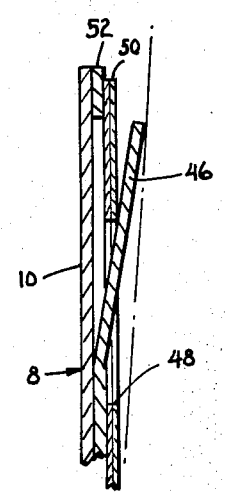
FIG. 8 is an enlarged, fragmentary side elevational view of the flap and is taken on line 8—8 of FIG. 7.

Referring briefly to FIGS. 2 and 6–8, in one preferred embodiment of the invention screens 19 and 32 are constructed of thin plastic sheets such as polyethyline films having a thickness of no more than a few mils. Such plastic film is inexpensive, readily available and easy to work. However, it has no inherent rigidity so that sidewalls 21, 22 of screens 19 and 34 of screens 32 have a tendency to collapse unless supported. For that purpose a plurality of tabs, preferably two tabs, are provided on each upright wall 10 of box 8. Each screen is provided with a like plurality of apertures 48 adjacent its upper edge 50 which protrude inwardly and preferably upwardly from box sidewalls 10. The apertures of each screen are engaged with the corresponding tabs as is best illustrated in FIGS. 7 and 8 to thereby maintain the screens in an upright position even though they are constructed of a thin, non-rigid material.

The tabs can be constructed in any desired manner. Their construction is facilitated by forming box 8 of double wall cardboard or the like and dye-stamping the inner cardboard panel 52 adjacent the upper end thereof. Thereafter the tab is simply but inwardly (as illustrated in FIG. 8) and the user engages the screen apertures with a tab. In use the tab may have any desired inclination. It will be noted, however, that when cover 28 is placed into the box the sides of the cover bias the tabs upwardly against the box sidewalls and the screens disposed in the box. This can be clearly seen in FIG. 8 where the box side is illustrated in phantom lines as it supports the flap in a steeply upwardly inclined position while the flap engages the screens through the apertures.

The construction of liner 12 and screen 19 from waxed paper or thin plastic film and the like and the mechanical retention of the screens in a stack not only renders them relatively inexpensive but substantially facilitates the ease with which they are transported and merchandised. The liner and screen can be disposed of after use to eliminate the need for cleansing. Sets of such liners and screens can be sold to the animal owner separately and independently of tray 9 and cover 28. To facilitate the merchandising, it is further preferred to construct the tray and the cover of prescored cartons and the like that are folded flat for shipping and storage and opened to the desired shape by the consumer. The shape of the tray and cover can of course be changed from that shown in the drawings to adapt them to individual tastes and needs. For example, the tray may have a triangular, squared, trapezoid or a free form with the cover correspondingly shaped.

We claim:

1. A disposable insert for a litter box with upright walls comprising a relatively thin, lightweight, flexible material having a floor portion and edge members arranged for upright positioning against the walls when the insert is operatively placed into the box, the floor including a center part with an array of spaced apart openings so that when the insert is lifted from the box litter can pass through the openings for reuse while waste is retained on the insert for subsequent disposal and means for closing the openings as long as the insert remains in its operative position in the box to retain the litter and the waste in the insert and for opening the openings upon the lifting of the insert from the box to permit the sifting of litter and retain waste in the insert for the subsequent disposal thereof.

2. An insert according to claim 1 wherein the means for closing and opening comprises a second insert disposed beneath the first mentioned insert, the second insert including a center portion, and including an array of plug members on the center portion of the second insert arranged for insertion of the plug members in the openings of the first insert to align the inserts and prevent passage of litter to the second insert until the first insert is lifted.

3. A litter box according to claim 1 wherein the edge members are defined by generally narrow and relatively long rectangles and including means between adjacent ends of the rectangles permitting pivotal movement of the rectangles into an upright position while preventing litter and the like from passing from between the adjoining rectangles of the uprighted insert.

4. A litter box according to claim 1 including means for closing the holes while the insert is in the box, the closing means comprising thin covers integrally constructed with the insert.

5. A litter box according to claim 4 including relatively narrow hinge means for each cover means connecting a relatively narrow portion of the circumference of the cover means with the floor portion of the insert.

6. A litter box according to claim 5 wherein the holes are arranged about a reference point located in the vicinity of a center of the floor portion, and wherein the hinge means is located at a portion of each hole proximate the reference point.

7. A disposable set of litter screens for the successive screening of litter and intermittent removal of waste products without the need for dumping boxes and soiling hands comprising: a linear constructed of a flat, water-proof, thin and readily deformable sheet, the liner including a plurality of plug members secured to a side of the liner and extending substantially perpendicularly away from that side, and a plurality of screens constructed of another flat, waterproof, thin and readily deformable sheet having a shape complementary to that of the liner and a plurality of cutouts equalling the plurality of plug members on the liner, the cutouts having a size and being arranged complementary to the size and arrangement of the plug members for placement over the plug members to thereby simultaneously index the screens with respect to the liner and prevent the passage of materials through the cutouts while the screens are retained on the liner.

8. A disposable set of litter screens for intermittently screening litter for subsequent reuse and for removing of waste products comprising a plurality of thin, flexible water resistant sheets stacked one on top of the other and having an outline for placement inside a litter box, the sheets defining a center and having a multiplicity of holes arranged about the center, the holes in the screens being in mutual alignment, a flap for each hole and a hinge for each flap hingeably connecting the flaps so the screen, the flaps and the hinges being intergrally constructed with the screen, the hinges facing towards the center to facilitate the opening of the holes upon removal of the screen from the stack for sifting litter through the holes.

9. A litter screen set according to claim 8 wherein the flaps are deflected out of the plane of the corresponding sheet and intimately engage a portion of an adjacent screen to thereby form a releasable connection between the screens of the stack which maintains the screens in mutual alignment.

10. A litter screen set according to claim 8 wherein the screens are constructed of a paper impregnated with a water resistant material, and wherein the holes have a diameter of about 0.5 inch and a hole spacing of about 0.75 inch to facilitate the sifting and retain sufficient strength for lifting the screen with waste materials thereon.

11. A litter box for the ready removal of waste without emptying litter from the box and for maintaining the litter box in a substantially hygienic condition comprising: a self-supporting frame including upright walls, a liner constructed of a thin, flat, flexible sheet for placement in the frame to form a receptacle with the liner, at least one waste removal screen constructed of a thin, flat, flexible sheet, the removal screen including a plurality of openings generally arranged about a center of the removal screen, whereby a litter and waste container is formed when the removal screen is placed into the receptacle, and means for closing the openings as long as the removal screen remains in its operative position in the receptacle and for opening the openings upon the lifting of the removal screen from the liner to permit the sifting of litter and retain waste on the removal screen for the subsequent disposal thereof.

12. A litter box according to claim 11 including means for indexing the relative position of the removal screen on the liner.

13. Apparatus according to claim 12 wherein the indexing means and the opening means comprise a plurality of plug members secured to the liner and arranged for extension through the holes in the removal screen, the plug members having a cross section complementary to the size and shape of the openings to substantially completely close the openings while positioning the removal screen and maintaining it in such position until the lifting thereof.

14. A litter box according to claim 11 wherein the closing means comprises flaps and means hingeably connecting the flaps to the screen so that upon removal of the screen from the receptacle litter on such screen forces the flaps downwardly and thereby opens the openings for sifting the litter while waste is retained on the screen.

15. A screen according to claim 14 wherein the flaps and the hingeable connecting means are integrally constructed with the screen, and including a plurality of screens stacked on top of each other and means releasably securing the stacked screens to each other.

16. A litter box according to claim 15 wherein the releasable securing means comprises portions of the screens defining the flaps and the holes in intimate engagement with each other so that the application of a force is required to separate the screens from each other.

17. A litter box according to claim 11 including a removable cover having an open lower end and a shape for placement over the center of the screen, the cover including an opening of sufficient size to permit the ingress and egress of an animal.

18. A litter box according to claim 11 wherein the screen is constructed of a non-rigid, collapsable sheet, and including means for maintaining side portions of the screen sheet in an upright position adjacent the upright walls of the frame.

19. A litter box according to claim 18 wherein the supporting means comprises tab means secured to the frame, the tab means projecting inwardly and upwardly from the upright walls, and apertures in the screen sheet positioned for engagement with the tabs so that the tabs maintain the side sections in an upright position.

20. A litter box according to claim 19 wherein the tabs are integrally constructed with the upright walls.

21. A litter box according to claim 20 wherein the frame is constructed of double wall material, and wherein the tab is integrally constructed with an inner member of the double wall frame.

22. A litter box comprising a generally rectangular tray having a substantially flat bottom and self-supporting upright sides, a liner constructed of a thin, readily deformable material having a center portion complementary to the flat floor of the liner and upright walls joined to the section, and a plruality of screens placed over the liner and having an outline complementary to that of the liner, each screen including an array of cutouts distributed about a center of the screen, the cutouts having a size permitting the passage of granular material while retaining animal waste on the screen, the screen further including flaps integrally constructed with the screen and hingeably connected thereto for closing the cutouts while the screen rests on the tray and for automatically opening the cutouts upon removal of the screen from the tray to permit sifting of unsoiled litter onto the next lower screen while retaining the waste on the removed screen for the subsequent disposal thereof.

23. A litter box according to claim 18 wherein the liner and the screens are constructed of moisture resistant paper.

24. A litter box according to claim 19 wherein the holes in the screen have a diameter of about 0.5 inch, and including a minimum spacing between adjacent edges of the holes of about 0.25 inch.

25. A litter box according to claim 18 including means for hingedly connecting the flaps to the screen, the hingeable connecting means generally pointing in a direction towards the center of the screen to facilitate the opening of all holes upon removal of the screen from the tray.

26. A litter box comprising: a generally rectangular tray having a substantially flat bottom and self-supporting upright sides, a liner constructed of a thin, readily deformable material having a center portion complementary to the flat floor of the liner and interconnected upright walls joined to the section, the liner including score line means to facilitate the formation of bends between adjacent walls and between the walls and the center section, the liner further including adjacent a center of the portion an array of plug members secured to the liner and extending perpendicularly away therefrom, and a plurality of screens placed over the liner and having an outline complementary to that of the liner, the screens including an array of cutouts in center portions of the screens arranged and sized complementary to the arrangement and size of the plug members for extension of the plug members through the cutouts to close the cutouts and mutually align the liner and the screens, the screens further including means facilitating the deflection of side sections into continuous upright sides substantially perpendicular to the center portions for the simultaneous insertion of the screens and the liner into the container, whereby placement of litter into a top screen retains the litter on that screen and lifting of the top screen disengages the plug members from the cutouts in the top screen and permits sifting of the litter onto the next lower screen while retaining the waste on the removed top screen for the subsequent disposal thereof.

* * * * *